United States Patent
Whittaker

[11] Patent Number: 6,041,337
[45] Date of Patent: Mar. 21, 2000

[54] LINEAR FUNCTION GENERATOR METHOD WITH COUNTER FOR IMPLEMENTATION OF CONTROL SIGNALS IN DIGITAL LOGIC

[75] Inventor: Bruce Ernest Whittaker, Mission Viejo, Calif.

[73] Assignee: Unisys Corporation, Blue Bell, Pa.

[21] Appl. No.: 08/980,358

[22] Filed: Aug. 28, 1997

[51] Int. Cl.$^7$ .................................................. G06F 17/11
[52] U.S. Cl. .......................................................... 708/274
[58] Field of Search ...................... 364/719, 735, 364/183; 377/49; 345/443; 708/274, 446

[56] References Cited

U.S. PATENT DOCUMENTS

| | | | |
|---|---|---|---|
| 3,524,049 | 8/1970 | Götz et al. ................................. | 364/719 |
| 3,564,222 | 2/1971 | DiPaolo ................................. | 364/735 |
| 4,479,192 | 10/1984 | Yamagami ................................. | 364/719 |
| 4,498,036 | 2/1985 | Salemka ................................. | 364/183 |
| 4,882,740 | 11/1989 | Abe et al. ................................. | 377/49 |
| 5,189,314 | 2/1993 | Georgiou et al. ................................. | 377/49 |
| 5,793,380 | 8/1998 | Matsumo ................................. | 345/443 |

*Primary Examiner*—David H. Malzahn
*Attorney, Agent, or Firm*—Alfred W. Kozak; Mark T. Starrr; Steven B. Samuels

[57] ABSTRACT

A method for using linear functions with counter modules for efficient implementation in PALs (Programmable Array Logic), or FPGAs (Field Programmable Gate Arrays) which generate digital control signals to a targeted digital device.

An input setting pulsed digital signal A is upcounted and then is reduced by a downcounted feedback pulsed digital signal to produce a difference digital signal which involves adding an intercept value. The difference signal is multiplied by a slope-sensitivity parameter, each time expanding the numeric range and scope of the output digital control signal to the target digital device.

10 Claims, 12 Drawing Sheets

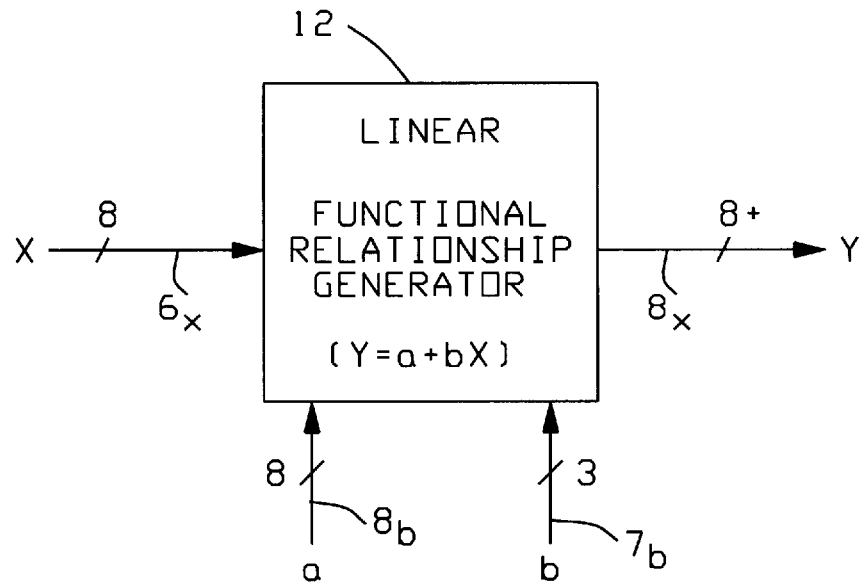
FIG_8
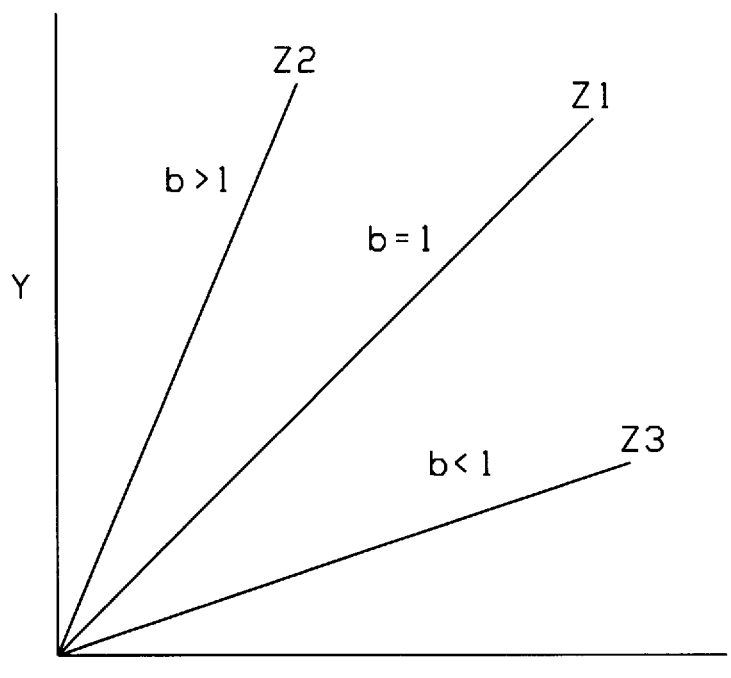
LINEAR FUNCTIONS
FIG_9

$X = A - C$   # STEPS REMAINING TO MOVE MOTOR $Y = a + bX$   DRIVE VOLTAGE TO MOTOR

LINEAR FUNCTION GENERATOR METHOD WITH COUNTER FOR IMPLEMENTATION OF CONTROL SIGNALS IN DIGITAL LOGIC

CROSS-REFERENCE TO RELATED APPLICATIONS

This disclosure is related to a co-pending application entitled "Digital Device Control Method and System Via Linear Function Generator Implementation Using Adder for Intercept" filed Aug. 28, 1997 as U.S. Ser. No. 919,389, Allowed and which is incorporated by reference.

FIELD OF THE INVENTION

This disclosure provides a method utilizing a counter module and linear function generator to develop digital output control signals which can easily be implemented efficiently in basic programmable digital logic devices.

BACKGROUND OF THE INVENTION

In the development of control systems for digital devices, it has long been a problem as to how to sufficiently implement logic circuitry in order to provide control signals to regulate and control a target digital device. In earlier periods of technology, analog signals and analog circuitry was used to generate analog signals which would be transmitted to analog target devices in order to control their operation. With the advent of digital logic circuitry and with the great flexibility of use with Field Programmable Gate Arrays (FPGAs) and also with the use of Application Specific Integrated Circuits (ASICs), there can be great efficiencies provided in using digital busses carrying multiple-bit digital signals which can be digitally processed in order to provide the desired or required control signals for target digital devices.

Many of the Input/Output and control signals in digital circuitry are seen to have mathematical relationships to each other. Thus, with the use of functional relationship generators which can be implemented in digital circuitry, it can be found to be quite efficient to use various signals and parameters in order to develop a desired output control signal.

The presently described system and method illustrates how the mathematical and functional relationships of digital signals in electronic circuitry can be represented by the use of simple, standardized logic design elements. These systems and methods can be built into simple, industry-standard programmable logic elements, for example, such as PALs (Programmable Logic Arrays) or Field Programmable Gate Arrays (FPGA's).

Digital computers and related logic require "digital" binary values (not an analog voltage or current). If analog circuitry was used, then some form of analog-to-digital conversion was necessary to allow other digital logic to utilize the linear values.

If a linear relationship is created "digitally," then this extra analog-digital conversion circuitry is no longer required.

Also by using single standard FPGA (Field Programmable Gate Array) devices, the cost is reduced and the functions required can be modified and made flexible by the act of simple re-programming.

SUMMARY OF THE INVENTION

A method and system is provided for creating digital control signals to a target digital device which can be implemented with linear function generators using counter circuitry.

A control system provides a linear function generator which receives inputs from an operator or electronic digital source (A), then subtracts a digital feedback signal (C) to develop a difference-signal (X) through implementation of a counter module. Thus, the difference signal X is the digital difference value of the digital signal input A, minus the digital signal feedback line C. By using a high-speed internal clock rate for the logic, it is then possible to implement the generation of the difference signal by a counter module. Thus, the A and C signals are passed into an arbitration logic block which synchronizes both signals to an internal clock rate (CLK) to develop an "UP" signal. The input signal A generates the UP output from the arbitration logic unit, while the C feedback signal generates a "DOWN" output signal from the arbitration logic. The UP and the DOWN signals are fed to a counter which provides the difference value X.

The difference signal X is multiplied by a slope parameter "b" and then combined with an intercept value "a" to develop a control signal for the target device.

This is accomplished by the specialized difference counter 6dc of FIG. 7 which adds the intercept value "a" to the difference counter (A–C) to generate signal X which operates on larger bus 6X by having a greater number digital bit lines (8+) than the 8-bit input busses for signals A, C, and "a".

Thus, the signal X on the bus 6X already has the added "a" value and now will be multiplied by a slope value "b" (FIG. 6) to generate Y on bus 8x which now utilizes a still larger bus of 8+ lines to develop the output control signal Y for control of the target device. Thus the value flexibility and numerical range of the digitally expanded ouput signal enables a higher and more variable control signal to a digital target device which is being controlled.

BRIEF DESCRIPTION OF THE DRAWINGS

FIG. 8 is a generalized basic block of a linear function generator which correlates inputs and outputs;

FIG. 9 shows the linear relationship between X and Y for different values of the slope "b";

GENERAL OVERVIEW

Figure 2A:
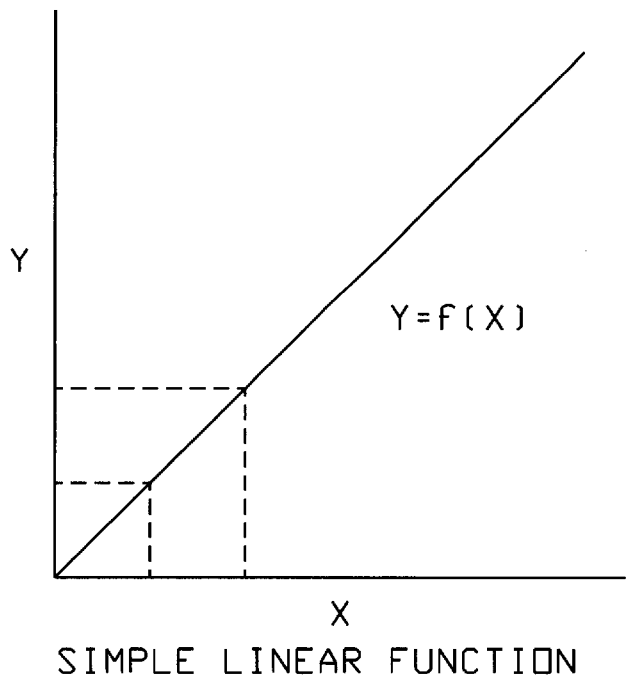
FIG. 2A is a diagram of a simple linear functional relationship between a parameter X in relation to a parameter Y for analogy to digital logic circuitry and input/output relationship.

Referring to FIG. 2A, there is seen the graphical representation of a simple linear functional relationship. Here, a value Y, which is on the vertical axis, is seen to be a basic function of X on the horizontal axis. As X increases (or decreases), the value Y increases (or decreases) in direct proportion. Thus, in FIG. 2A, the relationship equation can be indicated as Y=f(X).

Figure 2B:
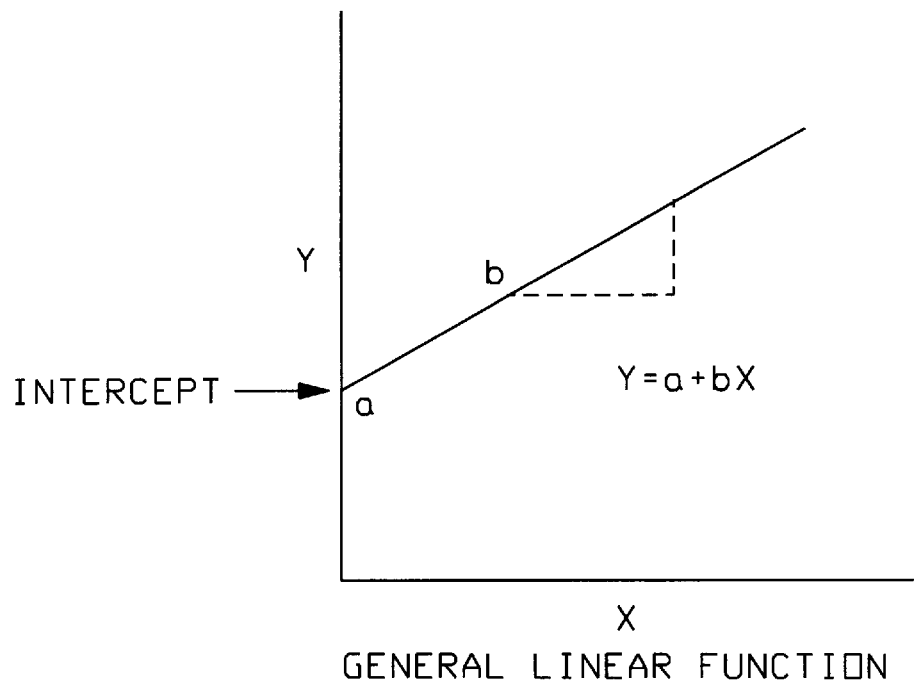
FIG. 2B shows a similar relation of X and Y, but with an intercept "a" for Y when X=0, such that Y=a+bX.

FIG. 2B shows a more generalized linear function. Here the relationships between Y and X are specified in their most general linear form by the equation:

$$Y=a+bX$$

where "a" equals intercept value of Y when X=0;

and where "b" equals slope value of the line.

Thus, it will be seen that when the X value is zero (X=0), the Y has a value of "a", which is the intercept constant.

The other constant "b" controls how quickly Y will change as X changes, that is to say, the slope "b" of the linear line. The greater the "b" value, the steeper the line and therefore the greater impact a change in X has on the value of Y.

In the simplified case of FIG. 2A, the intercept "a" as a value of zero and the slope "b" has the value of "1". Thus, at X=0, Y is also zero (Y=0). Also, it may be noted in this case, that for each unit change in X, there is a direct unit change in the value of Y, thus Y is proportional to X.

DESCRIPTION OF THE PREFERRED EMBODIMENT

Figure 1:
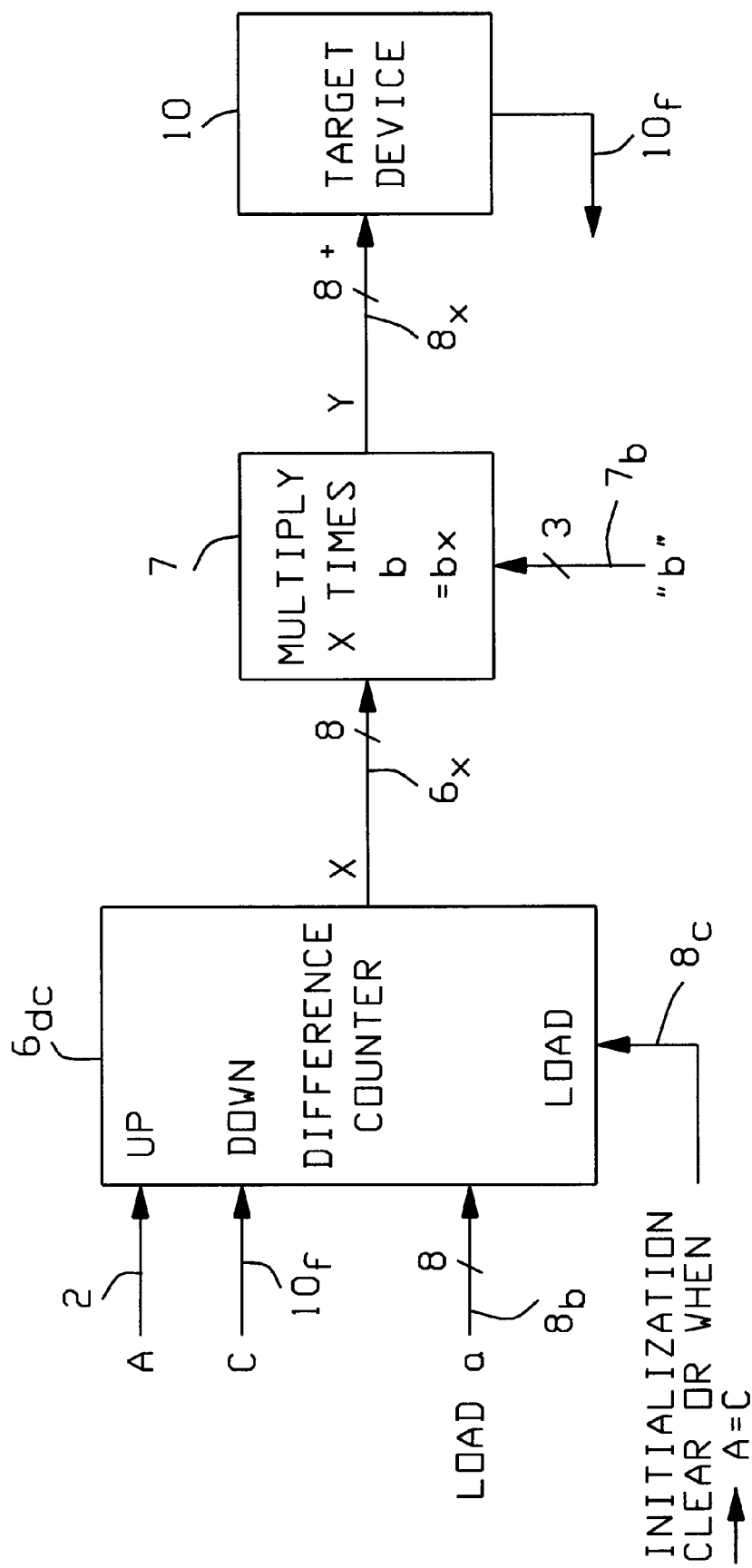
FIG. 1 is a block diagram illustrating how an digital input signal and digital feedback signal can be programmed to develop an output control signal of a precise nature to a digital target device.

FIG. 1 is a block diagram showing a linear relationship counter method system by which a control signal Y can control a target device 10 as a result of a digital input signal A on line 2 and a digital feedback signal C on bus 10f. The digital signals A and C are fed to a counter module (FIG. 5) whereby common clock signals 6k are used to count the A input on the upside and to count the feedback signal C on the downside, so that the counter output signal X on line 6x will be the difference signal or difference value between A–C.

Thus in FIG. 1, the difference counter module 6dc is seen to have two inputs, that is to say, one selected input A is a pulse stream signal on line 2 while the pulse stream feedback signal C on line 10f is received from target module 10. The difference counter module 6dc takes the difference value (A–C), adds in the digital 8-bit intercept value "a" on line 8b and outputs it as the signal X onto the first output bus 6x which is an 8-bit bus.

The signal A on line 2 and signal C on line 1 of involve streams of digital pulses. For example, if the operator wishes the target to perform a particular operation, the operator might insert 20 pulses on line 2 for signal A. This counts "up" for the difference counter 6dc, to indicate the 20 pulses as a proportional value. Then as the target device 10 "moves" or responds to the Y signal on bus 7X, the target device feeds back a series of pulses on line 10f which pulses count "down" the difference counter 6dc. Thus when the target is "moved" the correct amount, the difference counter will reflect A–C=0 again.

The 8-bit digital bus 6x is fed to the multiplier module 7 which has another 3-bit input bus designated 7b which conveys the slope value "b". As a result, the multiplier module 7 will provide a digital output on a second output bus 8x, which is now a larger size bus and designated as having 8+ bit lines.

The difference counter 6dc has the pulse stream input A on line 2 and the pulse stream feedback signal C on line 10f. Additionally, the intercept value "a" (of FIG. 2B) constitutes an 8-bit signal input on line 8b. The "a" value is preloaded into the difference counter 6dc at initialization time (clear) via line 8c of FIG. 1, or whenever the A and C data streams are idle which indicates that the difference value X=0. Thus, the system of FIG. 1 develops the equation Y=ab+bX which establishes Y=a+bX since the product "ab" can be set up as the equivalent the intercept "a".

Figure 2C:
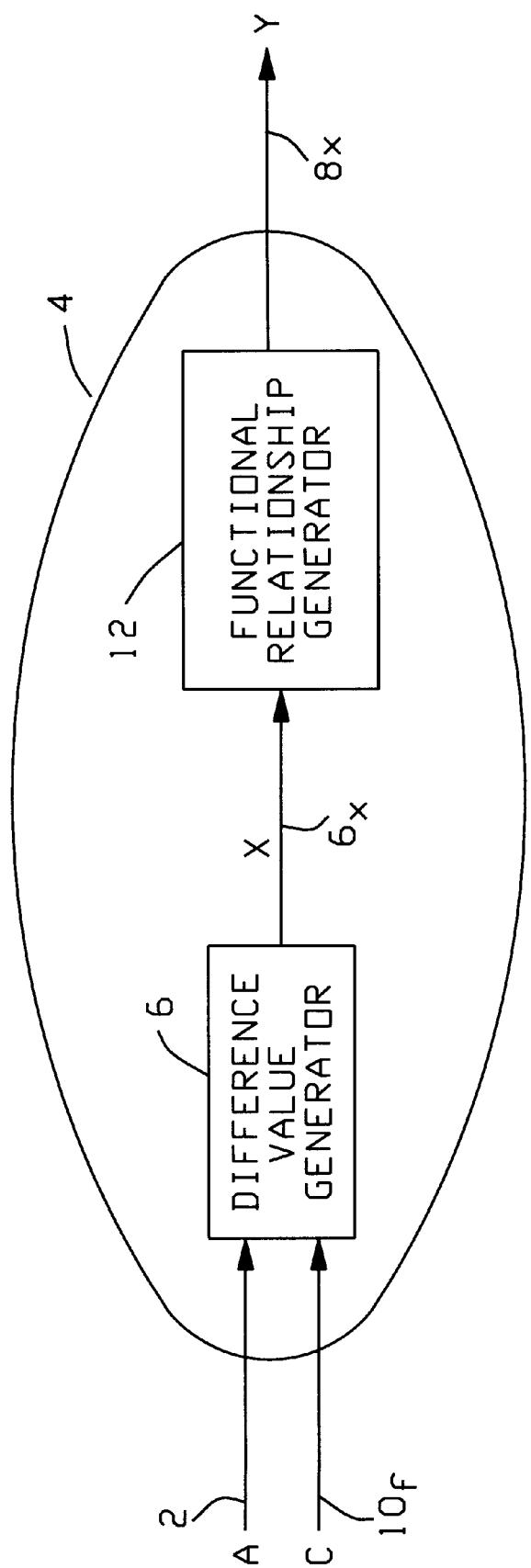
FIG. 2C shows a function generator for receiving an input and feedback signal to develop an output control signal.

FIG. 2C is a drawing of a linear function generator 4 which has a difference value generator 6, which is fed by the pulse stream digital signal A and the pulse stream feedback signal C. The difference generator 6 provides a first bus output on bus 6x and having a value X which is fed to the functional relationship generator 12, which generator 12 provides the digital output control signal Y on bus 8X.

FIG. 8 is a simplified block of the linear function relationship generator 12 which is seen to have the 8-bit bus 6x feeding the signal X into the generator 12 (which also receives an 8-bit intercept signal "a" on line 8b) and receives a 3-bit slope signal "b" in order to provide the digital output signal on bus 8x which is indicated as Y, the bus having 8+ bits rather than 8 bits. It should be noted in FIG. 1 that the "a" value has already been included into X for the present method.

Figure 3:
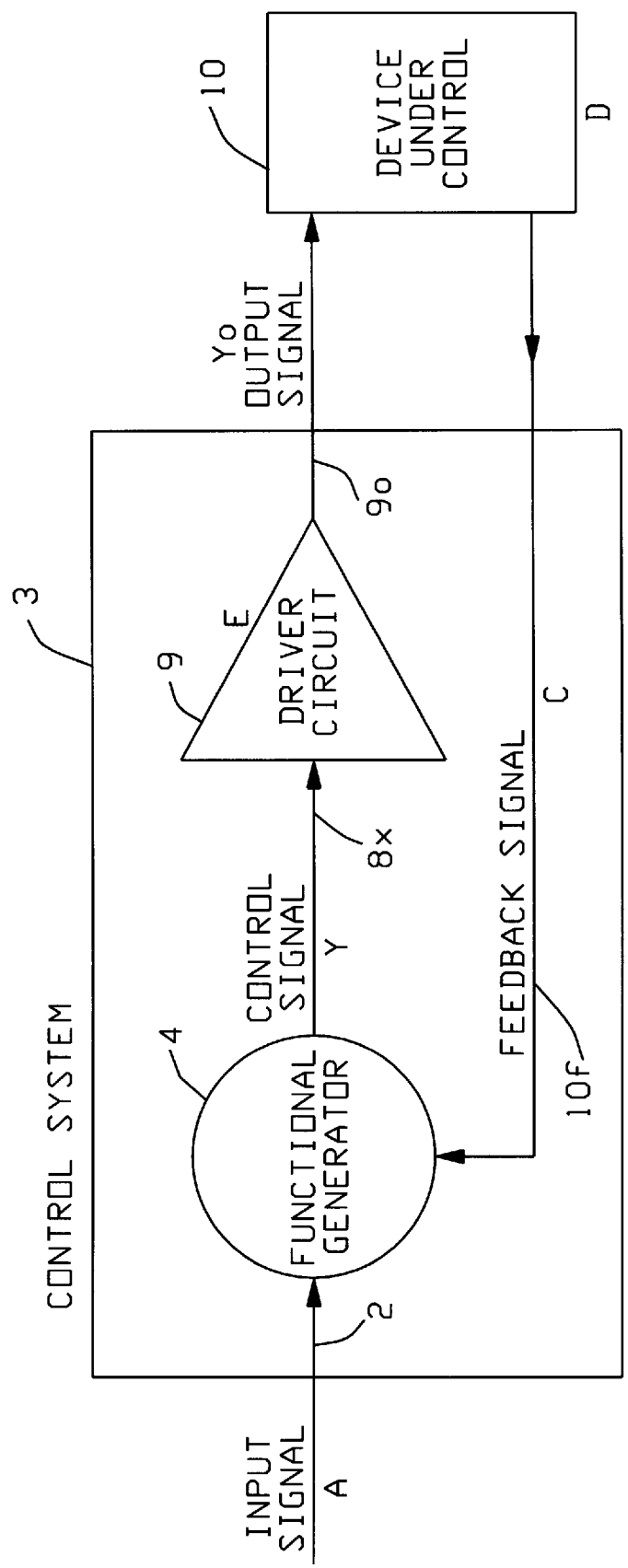
FIG. 3 is a diagram of a generalized control system wherein an input signal A determines a control signal Y which is driven to provide an output control signal Yo.

Control System Function: FIG. 3 illustrates a functional block diagram of a general control system. In FIG. 3, the block D is a target device 10 or item to be controlled. This could be a positional motor or any other controllable device such as a voltage controlled oscillator. The signal Yo on line 9o is the output control signal which is fed out of the control system 3. Internal to the control system 3, is a driver circuit 9, which creates the signal Yo from its input Y, on bus 8x. The controlling signal Y is derived from the functional generator circuit 4. The functional generator 4 will be seen to receive two inputs from which it can create the signal Y (control signal) on line 8x. These two inputs to the functional generator 4 are the input control pulse signal A on line 2 from the outside world and the feedback pulse signal C on line 10f from the device under control 10.

Thus, the above FIG. 3 and FIG. 1 describe a simple, basic negative feedback control system. The focus of the present disclosure will concern itself primarily with the functional generator block 4 and the control signal Y which has its output signal on bus 8x and bus 9o.

For any normal control system, the feedback signal C on line 10f is considered "negative feedback", that is to say, it subtracts in some way from the input control signal A on line 2 in creating the output control signal Y. Thus, if the device 10 under control is exactly where it should be (or has the condition which the input control signal A desires it to be), then the signal C would subtract from the signal A, such as to cause the signal Y to be "null" in value, and thus have no effect on the device 10 under control.

It can be imagined that the generation of the controlling signal Y from the inputs A and C can take on many forms, depending upon the nature of the device under control, 10.

Figure 4:
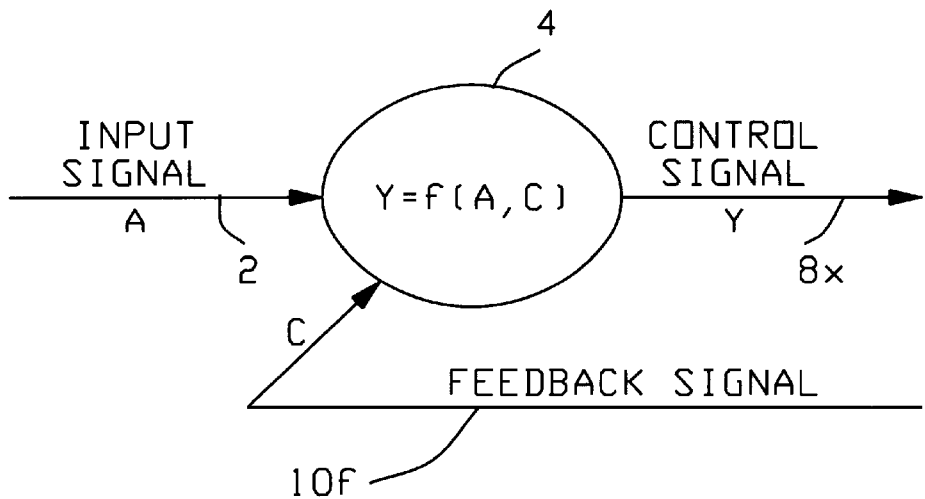
FIG. 4 is a diagram illustrative of the functional generator of FIG. 3.

FIG. 4 shows that the signal Y is some function of both A and C. That is to say, Y=f (A,C). The type of function depends upon the specific application involved. However, this function could be one of the prior mentioned mathematical relationships (of FIGS. 2A, 2B) described as a linear relationship. The ease of implementation of this relationship in simple, standard digital logic is another focus of the present system and method.

Figure 5:
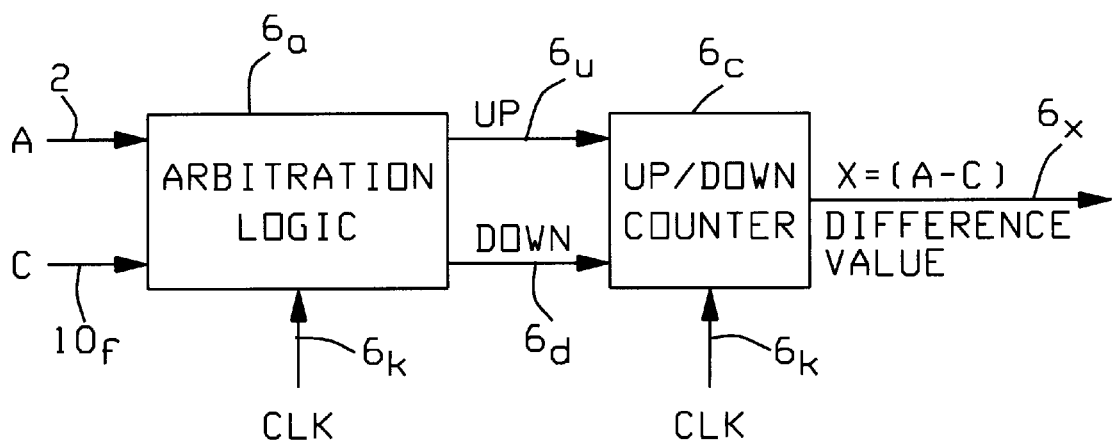
FIG. 5 is a block diagram of a difference counter generator utilizing a counter module.

In the control system of FIG. 3, the signals A and C are combined to form a single value which can be designated as X on line 6x in FIG. 2C and FIG. 5. Thus, as seen in FIG. 2C, X=(A−C), which is a "difference" value which is generated.

If the desired functional relationship between the controlling signal Y and the difference variable X is to be "linear", then, in such case, the controlling signal Y would vary in a smooth, straight-lined fashion linear relationship to the difference value X. This is indicated in FIGS. 2A and 2B.

Thus, FIG. 2A does show such a relationship. Such a functional relationship would indicate that no matter how far off from the null point the device may be (X=0), however, the controlling signal Y will only be as large as the "slope" that is provided by the straight, linear line shown in FIG. 2A.

FIG. 5 shows one method of counter implementation where signal A on line 2 and feedback signal C on line 10f feed to arbitration logic unit 6a which synchronizes the A and C digital inputs and feeds them to the up/down counter 6c. Both 6a and 6c are clocked by the same clock signal on line 6k such that the X digital output=A−C.

In the presently described counter method, the signals A and C are streams of digital pulses. These can be viewed in at least two ways:

1) The "number" of pulses on A and the "number" of pulses on C which develop the difference count X=A−C; or 2) The frequency rate of pulses on A and the frequency rate of pulses on C where X would still represent A−C, since the up-count is at the A rate and the down-count is at the C rate.

The arbitration logic 6a of FIG. 5 acts to synchronize both A (whether "number" of pulses or "rate" of pulses) to a higher speed internal clock (CLK). It also synchronizes C to the same internal clock on line 6k. Without the coordinating function of the arbitration logic 6a, the difference counter 6dc would reflect an indeterminate value.

Figure 6:
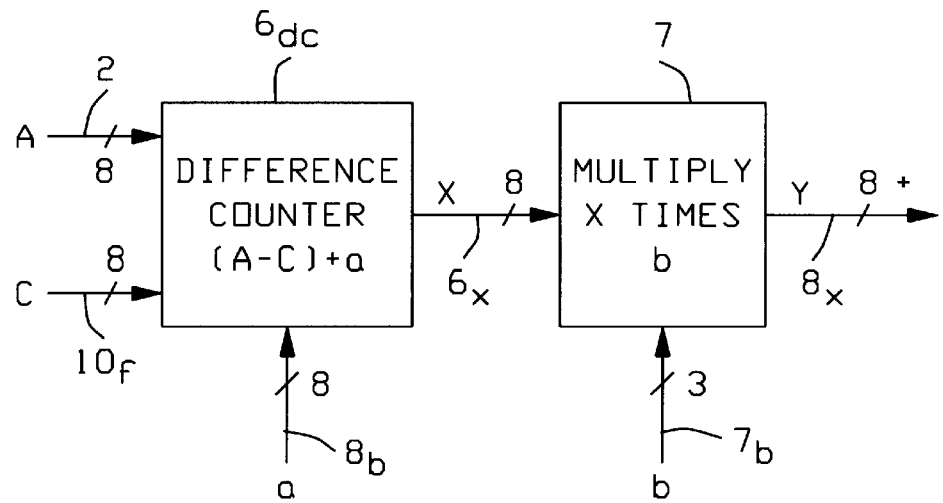
FIG. 6 is a drawing indicating how the difference counter adds the intercept value "a" to develop the signal X which is multiplied by the slope value "b"
Figure 7:
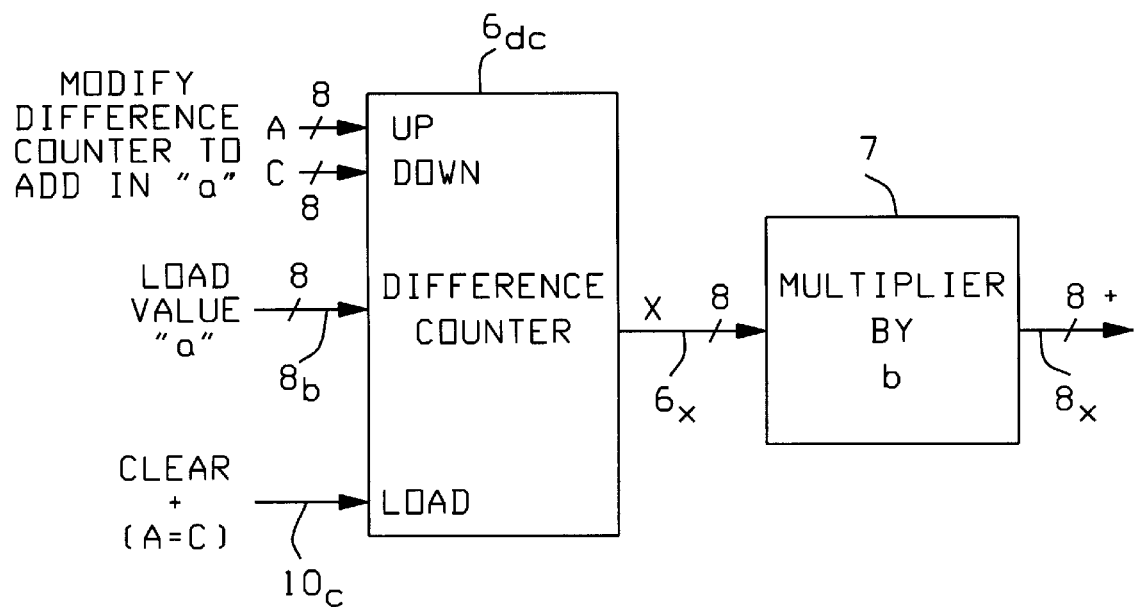
FIG. 7 shows a modified difference counter which loads the intercept value.
Figure 10:
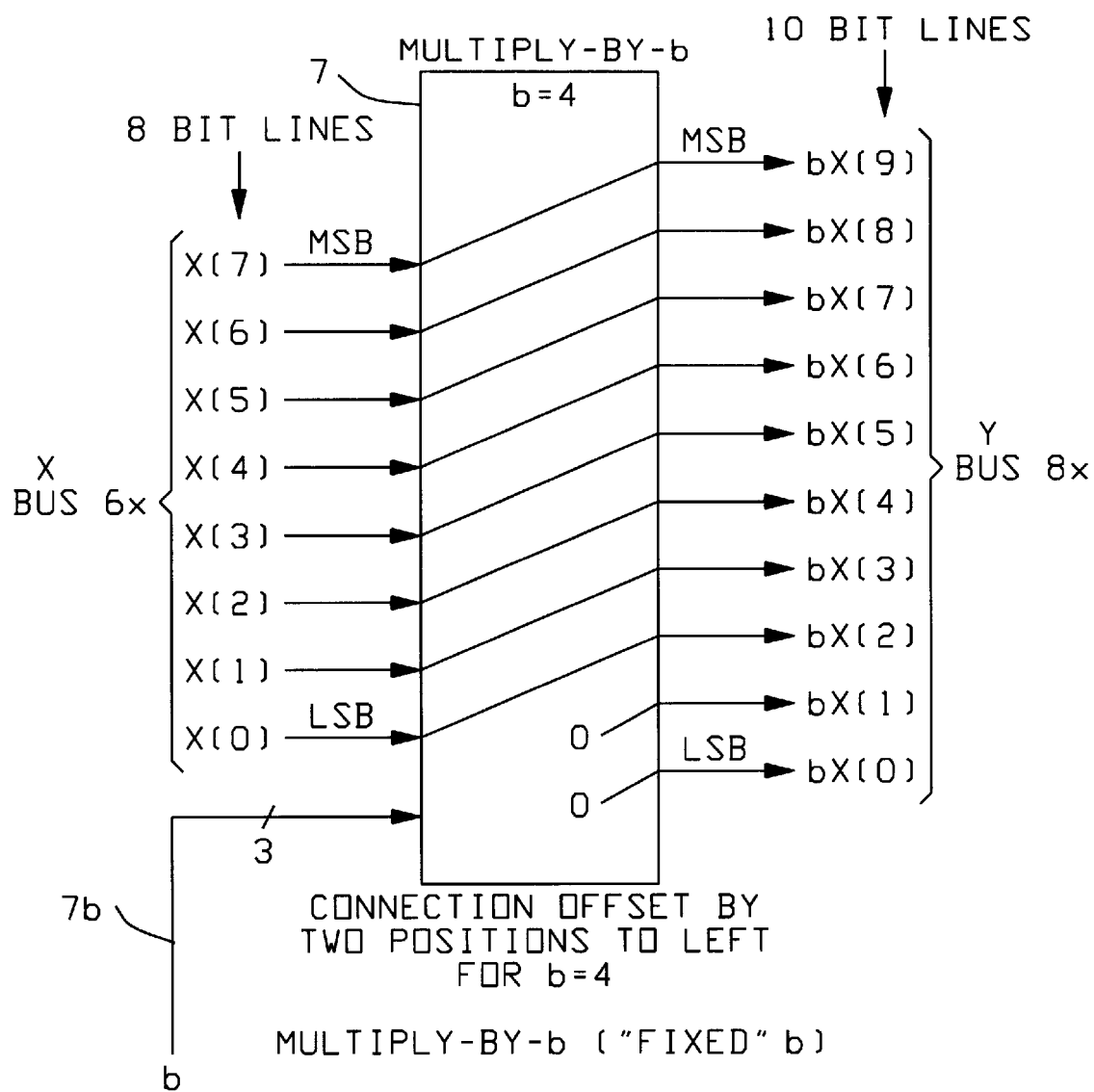
FIG. 10 shows the multiplication-by-b block for a fixed "b" value.
Figure 11:
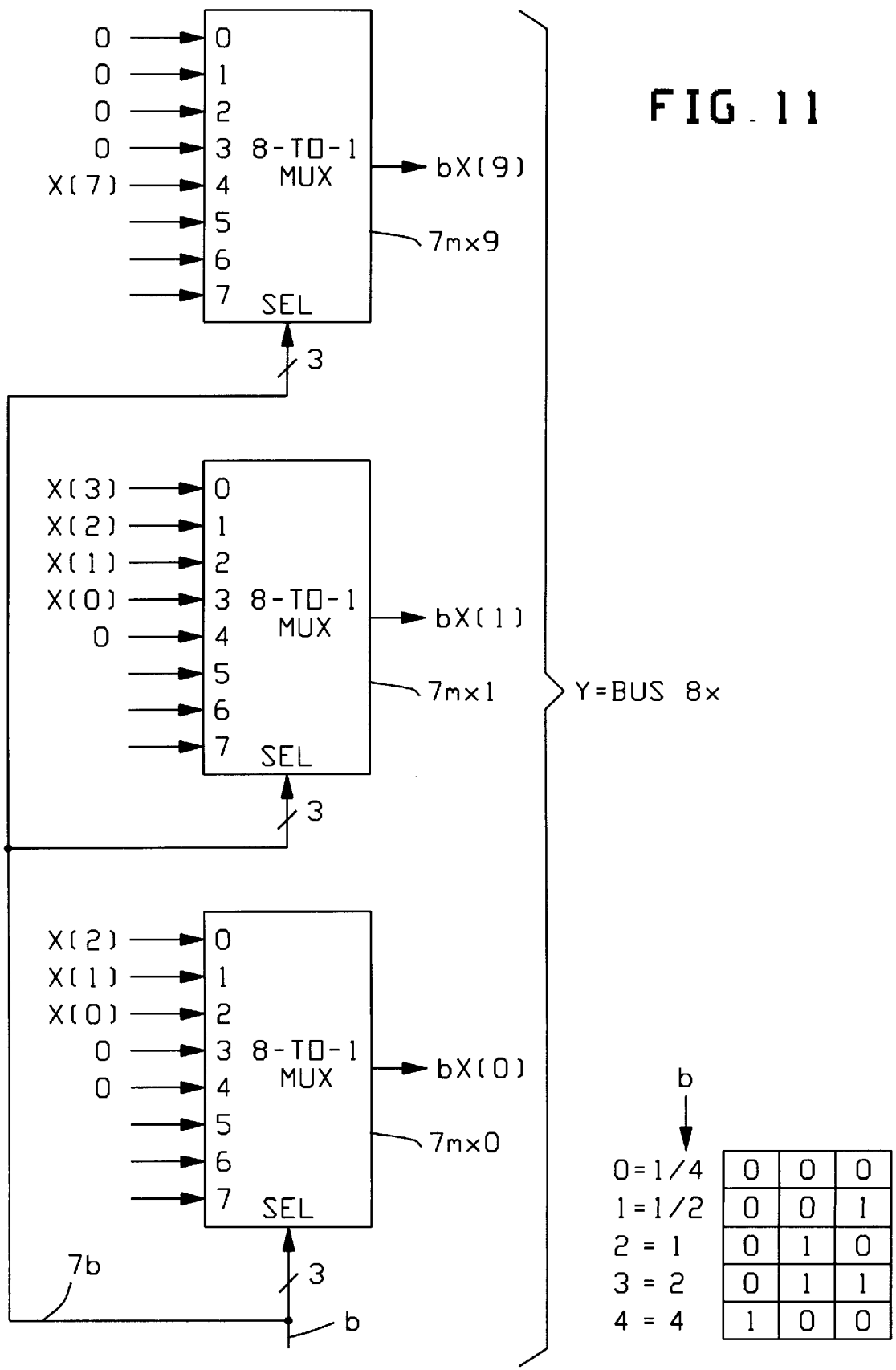
FIG. 11 shows the multiplication-by-b block for various "b" values.

Then, as seen in FIG. 6, the X (difference) signal can be multiplied by the slope value "b" as shown in FIGS. 10, 11. The intercept value "a" in FIG. 6 is seen to be included in X.

Thus the difference counter 6dc provides A−C while also adding in the intercept value "a" (8-bit bus) to provide an X value (bus 6X) which is then fed to multiplier 7 which provides the bx value to generate Y=a+bX on bus 8x which has a greater number of bit lines (8+) than bus 6x (only 8 bit lines).

As was earlier discussed in FIG. 1, in the counter difference block method for developing the difference value X, it was noted that the difference counter 6dc was "incremented" for the A signal and "decremented" for the C signal. Thus the difference signal output is the value of the counter which represents the digital signal X. From this method it is implied that, initially, if A and C are zero, then X is zero (i.e., no difference). However, if the X count value was always initialized to some fixed constant value other than zero, say to a value of "a", then when A and C are zero, the X value would carry some initial "bias" value, designated "a" as per FIG. 2B.

Thus this can be implemented in FIG. 1 by a change to the counter circuit module of FIG. 5 which develops the X signal. Here what is done is shown in FIG. 1, where the difference counter 6dc is seen having a input A (up) and a input C (down) plus a digital signal which presents a load value "a" as an input and also an initialization clear (A=C) signal to be loaded into the difference counter which results in the output signal X.

The load value of FIG. 1 is the parameter value "a" which is an 8-bit digital signal. The question arises when to load this value? In this situation, the terms created here function to load both when the system is initially cleared, at power-up time, and also wherever the A and C signals are equal. Thus FIG. 1 shows the modification of the X signal to include the added value of the "a" (intercept) digital signal value.

It might seem at this point that this method violates the linear equation Y=a+bX. But by a comparison of FIGS. 6 and 9, it will be seen that the only effect is to change the equation to: Y=ab+bX.

Now since "a" times "b" is still a constant, the proper equation will be seen to still constitute a valid result.

It might be considered that the intercept condition "a" (initial bias value) is usually not needed, and that the need to implement the "a" operation is not required. In most uses of a linear function relationship, when X is zero, then Y also should be zero and therefore "a" is zero and no logic is needed at all for this function.

However, most occasions on controlling a target digital module, such as a motor or other rotating device, it will be seen that there is generally some type of "bias" value which is required to hold the motor or digital device steady or at a preset position. Thus the use of parameter "a" is a valuable addition to be able to be utilized for this type of situation.

Linear Function Implementation: Once the difference value X has been generated, as is illustrated in the Counter difference methods of FIGS. 1, 5 and 6, then the Function Generator 4 of FIG. 3, can be used to generate the desired output signal Y (control signal). The special relationship between the signals X and the signals Y and Yo (driver output) provides the desired control signal to the digital device 10.

As was noted in FIG. 2B, the intercept element "a" is a constant value. If X=0, then Y="a". Thus, there is an "additive" to the X portion of the linear equation. In the simplified case of implementing a linear functional relationship, it might be easily assumed that "a" is 0, that is to say, no intercept. However, in the general case, some constant value for "a" will generally be used. In the following implementations presented below, several cases are described.

When the slope element "b" is a constant value, there is seen to be a multiplier (module 7 of FIG. 1) in the linear equation. The basic linear equation involved here is:

$$Y=a+bX \quad \text{(FIG. 2B)}$$

Here, "b" is the more important element, rather than "a", since "b" multiplies the effect of X onto the created value of Y. Here, two particular cases will be looked at. The first is a case where "b" is a value of "1". In such a case, any change in X maps directly and exactly into the same value of Y.

The second case allows a positive value for "b", and here the value of X is multiplied by "b" in order to produce Y.

It should be noted that since these functions are implemented in digital logic, and since "2" is the base for binary digital numbers, then the values for "a" and "b" will be in powers of 2, that is to say, $1=2^0$, $2=2^1$, $4=2^2$, $8=2^3$, $16=2^4$, $32=2^5$, etc.

Thus as will be seen subsequently in Tables I and II, the multiplication function can be efficiently handled by offset shifts of digital bit positions which lend themselves to easy implementation in the digital logic of PLAs and FPGAs.

FIG. 10 is a block diagram of one type of multiplier module 7 of FIG. 1, where the slope "b"=4. Here, the difference-signal X on 8-bit bus 6x is fed into the multiplier module 7. Additionally, a 3-bit bus 7b feeds the signal "b" into the multiplier module 7. This multiplier factor represents the slope b of FIG. 9 and is also shown in Tables I and II.

It should be noted that the output signal of the multiplier 7 is shown as Y (FIG. 6) and is indicated as having bus bits "8+" to indicate that this bus is larger (greater number of bit lines) than the input bus 6x of 8-bits.

FIG. 10 is a diagram showing how the multiplication of the amount by "b" (slope) occurs when the value of "b" is a "fixed" value, for example, such as b=4.

Here, in FIG. 10, it will be seen that the 8-bits of X are shown designated as X(0), X(1), X(2) . . . X(7) which indicates the bits of the X bus 6x as operating from the lowest significant bit LSB at X(0) up to the most significant bit MSB at X(7), giving a total of 8 input bits.

Under the concept of digital multiplication, for example, when the multiplier is "b"=4, this means that the base unit 2 is raised to the second power, so that $2^2$=4, and the exponential 2 means that the connection is "offset" by two positions to the left (shift up), when "b"=4, as seen also in Table I.

Then, as seen in FIG. 10, the output lines designated bX(n) will be seen to go from n=0 up to n=9 to give a total of 10-bit lines for the output bus 8x, which indicate from the least significant bit (LSB) to the most significant bit (MSB) as the output lines.

Thus, the multiplication module 7 here has increased the bus size from 8-bits up to 10 bits in order to characterize the new signal output bX(n).

The drawing of FIG. 10 represented the situation when the value of "b" was a fixed value, such as b=4. On the other hand, when "b" has other values, then FIG. 11 indicates the circuitry which can be used in order to multiply by b when b has other values as indicated in Tables I and II.

As seen in FIG. 11, the MUX 7mxo has 8 inputs designated 0–7 where X(0) feeds input 2, X(1) feeds input 1, and X(2) feeds input 0 while inputs 3 and are "0."

MUX 7mx1 has input 4 as "0" with X(0), X(1) X2, X3 feeding inputs 3, 2, 1, 0, respectively.

MUX 7mx 9 has input bit X(7) feeding input 4 of the 8 to 1 MUX.

Thus the output bus 8x is seen to have 10 bit lines designated bX(0) . . . b(X)9.

Here in FIG. 11, there are seen a series of multiplexers designated 7mxo, 7mx1, 7mx2, . . . 7mx9. Each of these multiplexers have an input select 3-bit bus designated "b", such that the input b can represent slopes of b=¼, ½, 1, 2, 4 as shown in the lower right side of FIG. 11, which are used for selection purposes in each of the individual multiplexers. It will be seen that each individual multiplexer has a different set of X input bits and each multiplexer will provide a separate bX output designated bX(n), where n can vary from 0 to 9.

The value of b for the input select line of each multiplexer is shown for various values of b as indicated in Table I.

It should be noted as seen in FIG. 1 that the Y signal (bus 8x) is designated as having 8+ lines since this represents a further expansion of the number of digital signal lines from those that were inserted on the X input bus 6x.

The Counter difference circuit 6dc of FIG. 1 can efficiently and easily be implemented in a PAL or a Field Programmable Gate Array (FPGA) device. The final output of the Counter Module 6dc is the difference variable X, where X=(A–C), plus the "a" intercept parameter.

Multiply-By-b Implementation: FIG. 9 shows the relationship between X and Y for three values of the slope "b". The first graph Z1 is for a unity slope (b=1). This is the simple case where X maps directly into Y, that is to say Y=X.

The second graph line of FIG. 9 shown as Z2 is for slopes which are greater than 1, for example, 2 or 4. In such cases, Y is greater than X by the multiplication factor of "b", for example, 2 times or 4 times greater.

The third graph line of FIG. 9, line Z3, is for slopes which are less than 1, for example ½ or ¼. Here, Y is smaller than X by this fractional factor, that is to say, ½ or ¼.

In the binary notation, digital logic multiplication by powers of 2 is accomplished by simply shifting a binary number to the left, or shifting to the right by a few bit positions. This is illustrated in Table I. Thus, if the binary value of X is shifted one position to the left to create Y, then X is multiplied by 2 so that Y equals 2X. Further, if X is shifted 2 positions to the left in creating Y, then X is multiplied by 4, thus giving Y=4X.

Conversely, if the binary value for X is shifted one position to the "right" in creating Y, then X is multiplied by ½ so that Y equals ½ of X. Likewise, if X is shifted 2 positions to the "right" in creating Y, then X is multiplied by ¼ so that Y=¼ of X. FIG. 10 indicated the example where b=4, causing a shift up of 2 positions.

The unity case is implemented by direct connection of all the bits of X to the corresponding bits of Y, so that there is no off-setting or shifting in either direction, i.e., there is direct mapping.

FIG. 10 showed the "multiplication-by-b" of multiplication block 7 for the example case of b=4. Here, the intermediate signal "bX" on bus 6x is shown. This is a portion of what creates the value of Y on bus 8x. It is important to note that since multiplication here can produce number values much larger than the number values that were initially used, then it is seen that bX bus 8x involves more bits and bit lines than does the input bus 6X value of X in bits, so that the output bus is expanded in size with added bit lines.

In the example of FIG. 10 where (b)=4, the 8-bit value of input X has a maximum value of 255 in decimal notation. Now since bX=4, it is seen that Y has the possible maximum value of 1020 (decimal notation) and this requires a 10-bit bus for bX in order to hold the full number. Thus, while the input involves an 8-bit bus, then after multiplication by b, it is seen that the output requires a 10-bit bus in order to hold the full range valued number.

It will be seen that, in the actual implementation of this multiplier element, that no shift registers are required to be used. It is merely a matter of connecting the individual bits of the X input lines to the appropriate bit positions of the output bX lines of FIG. 10. This can be efficiently done with PALs or FPGA's are mentioned heretofor. Table I below gives the connection mapping between X and bX for 5 different values of b.

TABLE I

| "b" (slope) | X(n) → bX(0) Connections | | Comment |
|---|---|---|---|
| 1 | X(0) | → bX(0) | direct map |
|  | X(1) | → bX(1) | connections |

TABLE I-continued

| "b" (slope) | X(n) → bX(0) Connections | | Comment |
|---|---|---|---|
| | X(n) | → bX(n) | |
| 2 | 0 | → bX(0) | offset (shift) up |
| | X(0) | → bX(1) | one position |
| | X(n) | → bX(n+1) | |
| 4 | 0 | → bX(0) | offset (shift) up |
| | 0 | → bX(1) | two positions |
| (FIG. 10) | X(0) | → bX(2) | (FIG. 10) |
| | X(n) | → bX(n+2) | |
| 1/2 | X(1) | → bX(0) | offset (shift) |
| | X(2) | → bX(1) | down one position |
| | X(n) | → bX(n−1) | |
| 1/4 | X(2) | → bX(0) | offset (shift) |
| | X(3) | → bX(1) | down two positions |
| | X(n) | → bX(n−2) | |

Very often, the linear parameters "b" and "a" are constants for a given design. Thus, if b is a fixed constant, the implementation of the multiplication-by-b function, is a basic bus connection scheme which is shown in FIG. 10. However, if some variability of the b parameter is needed, then a variable inter-connection scheme must be implemented as in FIG. 11. It will be seen that cascaded multiplexer chips provide the job of accomplishing such a variable interconnection method. FIG. 11 indicates the basics of such an implementation.

Table II shown below indicates the multiplexer selection with control term equations. Note that five case situations for "b" are shown, and "b" is assumed to be a 3-bit binary bus. This 3-bit "b" bus and the b slope values are also shown in FIG. 11.

TABLE II

| "b" | multiplexor input pin selected | multiplexor select terms (b-bus values) |
|---|---|---|
| 1/4 | 0 | 000 |
| 1/2 | 1 | 001 |
| 1 | 2 | 010 |
| 2 | 3 | 011 |
| 4 | 4 | 100 |

Linear Function Counter Method for Device Control: Referring to FIG. 1, there was shown a block diagram of the linear relationship counter method. This figure combines the functions of FIGS. 1, 3, 4, 2C, and 8 to perform the development of the output signal Y to fulfill the function Y=a+bX.

Figure 12A:
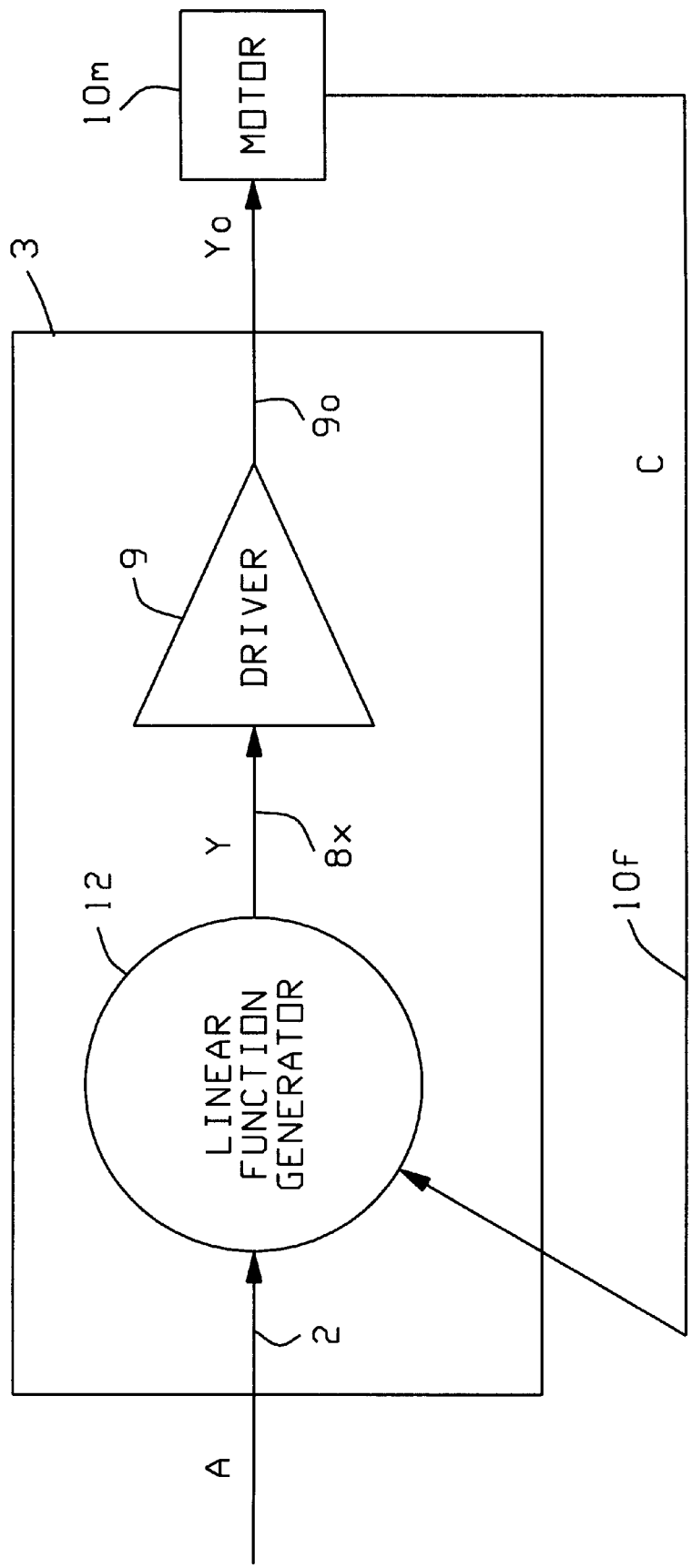
FIG. 12A is a drawing showing how a target device motor can be controlled by a function generator and driver.
Figure 12B:
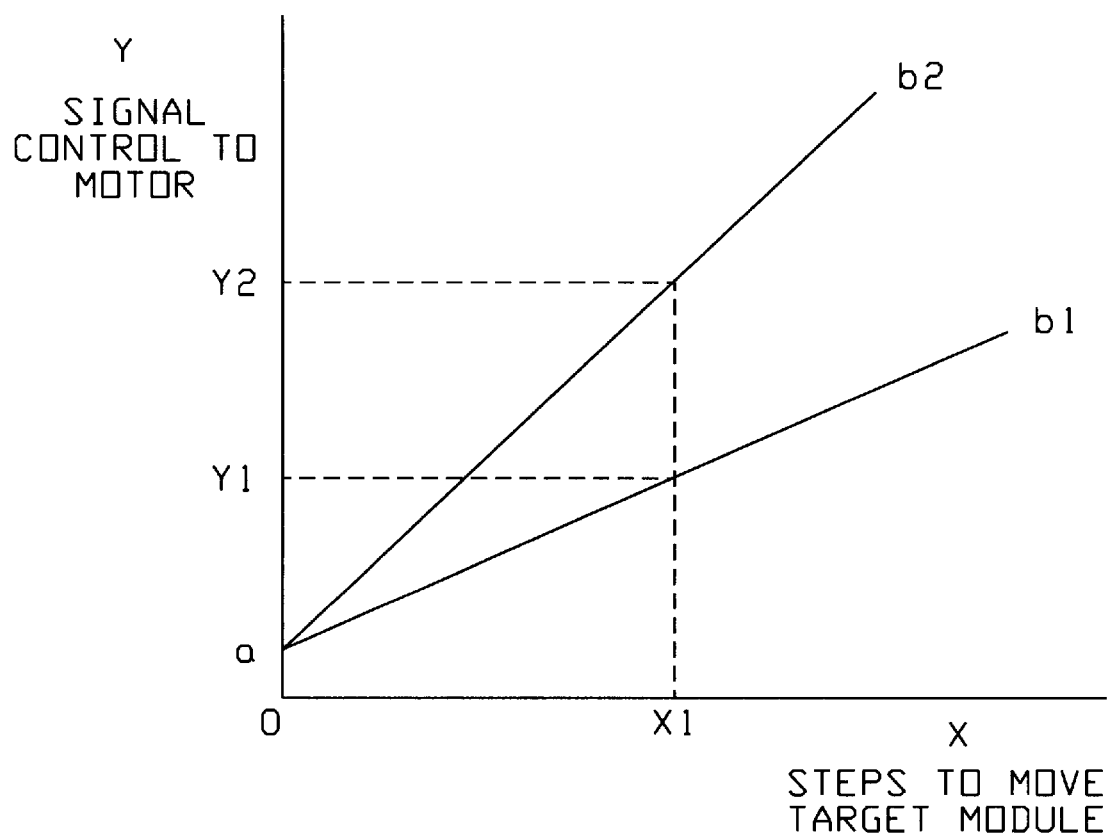
FIG. 12B is a parameter relationship drawing showing different slope values for regulating the output control signal.
Figure 13:
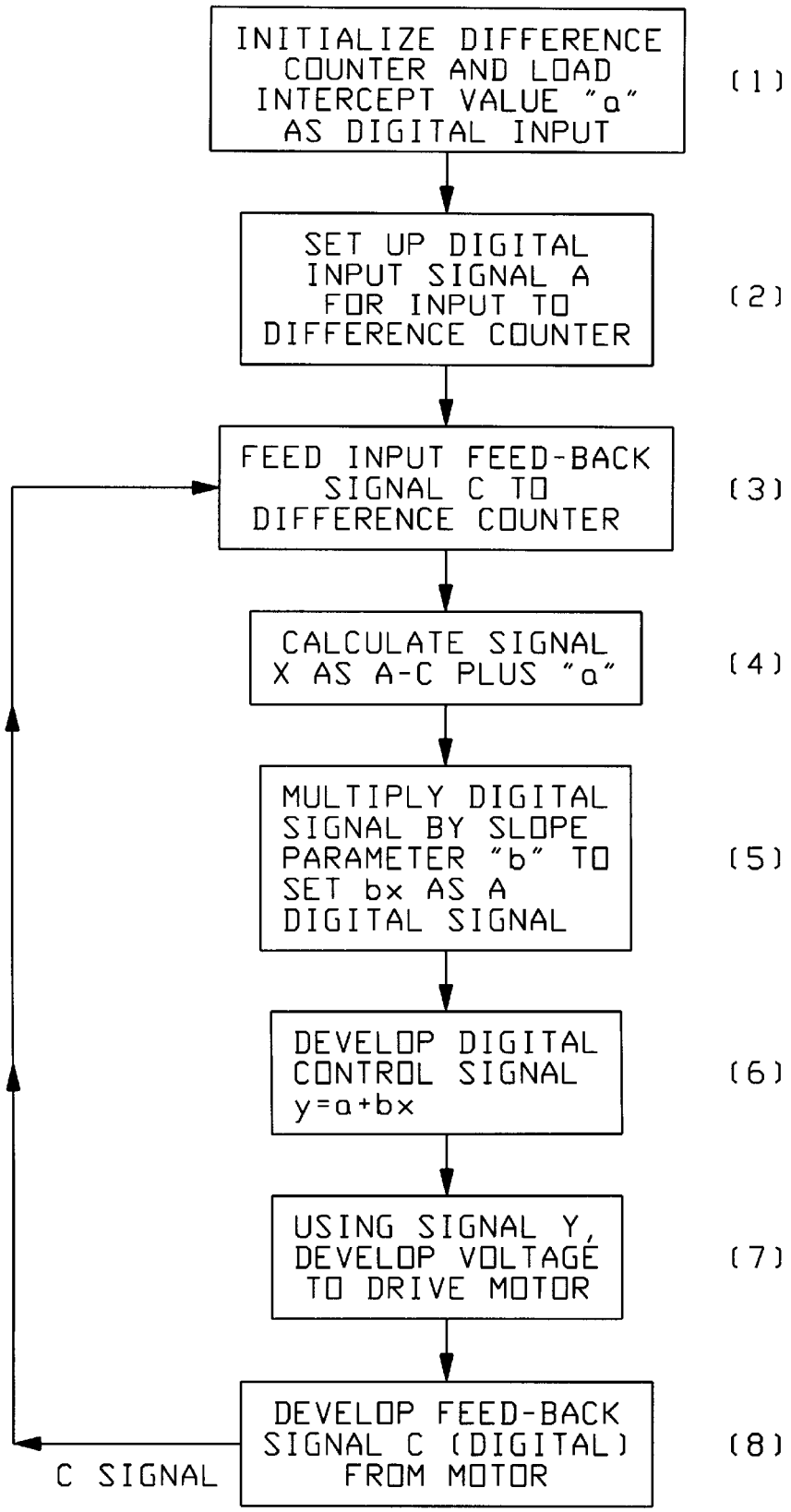
FIG. 13 is a flow chart indicating how the linear function counter method is implemented for use to control a target digital device.

One possible implementation of the use of this linear relationship by the counter method is indicated in FIGS. 12A, 12B and 13. In FIG. 12A there is seen a simple control system 3 to control the positional movement of a motor 10m. The motor can be made to move in tiny positional steps when a control voltage, derived from the output value Y, is applied.

As the motor (provided with a positional encoder) moves, then for each positional step movement, a feedback pulse is returned which is accumulated and shown as the signal value C. The input signal A specifies how far or how many steps the user wishes the motor to move. Thus, the difference value X=A−C, is a measure of the "difference" between the number of steps desired by the user and the number of steps already taken. Thus, when X=0, it is seen that the motor has moved to the desired position.

The described linear function will be seen to be appropriate for such an application. For example, the control signal Y, from which the actual control voltage to the motor is derived, is directly proportional (linear) to the number of steps needed to yet move the motor as represented by the signal X.

Thus, the steps shown in FIG. 13, which involve feeding the signals A and C to the Counter module 6 and adding the intercept value "a" to develop the output signal X which is then fed to a module 7 for multiplying by "b"(=bX) to provide an output signal Y which is amplified by a driver to make output signal Yo. It should be noted that, each of the input signals A and C marked in FIG. 11 are pulse streams in order to provide the final output signal Y as being equal to a+bX the final digital output being several orders of magnitude in number notation enhancement.

Thus, the standard linear equation, Y=a+bX, will be seen to fit this application adequately. From FIG. 12B, it will be seen how large a value of the signal Y is in relation to X, and this depends upon the multiplication factor, b, which is the slope. FIG. 12B shows two cases. It can be noted that for comparing the slope b2 versus b1, for the same X value, such as X1, then b2 slope gives a larger value for Y shown as Y2. The slope factor "b", might be considered as a motor-dependent parameter relating to torque and acceleration elements. If more voltage is needed for each count of X, then a larger slope parameter b could be used.

Also, as further seen in FIG. 12B, it will be noted that the intercept parameter "a" represents an initial value in Y when there is no value (0) for X. This applies in the given example. Thus, this might require some small bias voltage to hold the motor position fixed at the time when X is 0. Also, there might be a requirement for some initial bias value to overcome friction when moving the motor only a few steps. Methodology Sequence: FIG. 13 is a flow chart indicating the sequence of steps which implements the linear function counter method for developing a control signal for a target digitally sensitive device.

Referring to FIG. 13 and with relationship to FIG. 1, the step (1) requires that the user initialize a difference counter 6dc and load the intercept value "a" as a digital input.

At step (2), there is seen the users selecting a pulse stream signal A for input to the difference counter 6dc, while step (3) shows the input of a pulse stream feedback signal C from the target device 10.

In step (4), the calculation of the signal X is accomplished by the difference counter 6dc to provide the signal X as A−C+"a" in digital notation.

At step (5) the X signal is digitally multiplied by the parameter "b" to add the product bX to the X signal in order to form the digital output control signal Y at step (6), such that Y=ab+bX. Since "ab" is a constant in any situation, "ab" can be set as the intercept value in effect describing Y=a+bX.

At step (7), the digital signal Y is used to develop a voltage to the driver motor 10m of FIGS. 1 and 12A whereupon at step (8), the target device develops a feedback signal C as a pulse stream signal from the motor to inform the difference counter at step (3) what further signal generation is required in order to drive the motor to the desired location.

Thus, when the feedback signal C is equal to zero, then the only extant control signal is that represented by the intercept value "a" which is used to hold the motor to a desired pre-set position.

Described herein has been a system and method by which analog operating circuitry and elements can be converted to digital operational and control elements in order to provide digital signals which will result in digital control of a targeted digital receiving device, such as a motor or other appliance. This provides a very efficient way of accomplishing control signals with electronic modules since they can be converted to digital signals which can be implemented and controlled with inexpensive standard programmable array logic units (PALs) and also Field Programmable Gate Arrays (FPGAs) which generally have many surplus circuits available for utilization.

What is claimed is:

1. A method for flexibly expanding a digital bus input signal with an efficient implementation for a linear function utilizing spare gates in a Programmable Logic Array or Field Programmable Gate Array for generating an output digital signal for controlling a target digital modules comprising the steps of:

(a) generating a difference signal Xd in an UP-DOWN counter module which represents the value of a source-setting pulse stream signal (A) reduced by a feedback pulse stream digital signal (C);

(b) adding a N-bit digital intercept parameter value "a" to said Xd signal to generate an N-bit digital signal, such that Xd+a=Xa.

(c) multiplying said N-bit digital signal Xa by a slope parameter "b" to develop an (N+q) bit digital output signal Y, where q represents the digital offset value in binary notation corresponding to the specific value of the slope parameter "b" such that bXa=Y and thus Y=bXd+ba.

2. The method of claim 1 which includes the step of:

(d) converting said digital output signal Y to a precise voltage for controlling said target module.

3. The method of claim 1 wherein step (a) includes the step of:

(a1) synchronizing the digital pulses of said feedback digital signal (C) with the digital pulses of said source setting signal (A) in order that the count of pulses of said signal (A) will be reduced by the count of pulses of said signal (C).

4. A system, in a network having a linear functional relationship between an input digital signal X and an output digital signal Y, for efficiently developing and implementing in spare rates of a programmable logic array, a digital output control signal Y for a target module, comprising:

(a) means for generating a first pulsed sequence signal (A) representing a source generated setting signal of a sequence of pulses for a first input to an arbitration-synchronization module;

(b) means for generating a second pulsed sequence signal (C) representing a digital feedback signal from said target module utilizing a sequence of pulses as a second input to said arbitration-synchronization module;

(c) said arbitration-synchronization module having a high speed common clock signal for synchronizing said first pulsed sequence signal (A) and said second pulsed sequence signal (C) to produce an up count of pulses of said first signal (A) and down-count of pulses for said second signal (C) into a difference counter means;

(d) said difference counter means providing an output signal X=A−C which signal x is output on a N-Bit bus to a multiplier means;

(e) said multiplier means for multiplying said signal X by a slope parameter value "b" to generate said digital output control signal Y as output on a (N+q) bit bus where N is the number of bit lines fed into said multiplier means and q is a digital offset value in binary notation corresponding to the value of the slope parameter "b".

5. The system of claim 4 which includes:

(f) driver means for adapting said signal Y to said target module.

6. The system of claim 4 wherein said target module includes:

(g) means to generate a sequence of digital feedback pulses as signal C to said arbitration-synchronization module to indicate any deviation between signal C and signal A.

7. The system of claim 4 which includes:

(h) a third input signal "a" of N-bits fed to said difference counter means for adding in an intercept value which represents the value of Y when X=0.

8. A system for digitally generating an output control signal Y to a target module utilizing a linear function generator, which develops a digital difference signal Xd which is integrated with an intercept parameter "a" and multiplied by a slope parameter "b" to establish said output control signal Y in the relation Y=ba+bXd, said system comprising:

(a) Up/Down Counter means for generating an input digital signal Xa=Xd+a on an N bit input bus to a multiplier means where Xd is the digital difference between a digital source-setting signal (A) and a digital feedback signal (C) from said target module;

(b) said multiplier means for multiplying said input digital signal "Xa" by a slope parameter "b" to develop said output control signal Y=ba+bXd on a digital output bus of N+q bits where q represents the digital offset value in binary notation corresponding to the specific value of the slope parameter "b".

9. The system of claim 8 wherein said signal "Xa" is operative in a linear functional relationship such that the parameter "a" is the value of Y when X=0 and the parameter "b" is the slope of the line representing the linear relationship between Xa and Y.

10. The system of claim 8 wherein said Up/Down Counter means, said N bit input bus, said multiplier means, and said N+q bit output bus are implemented in gates of a Programmable Logic Array.

* * * * *